United States Patent [19]

Cohen et al.

[11] Patent Number: 4,597,840

[45] Date of Patent: Jul. 1, 1986

[54] PROCESS FOR THE CONTINUOUS PRODUCTION OF ALUMINUM BY THE CARBOCHLORINATION OF ALUMINA AND IGNEOUS ELECTROLYSIS OF THE CHLORIDE OBTAINED

[75] Inventors: Joseph Cohen, Paris; Bernard Gurtner, Grenoble; Yves Bertaud, St. Jean-de-Maurienne, all of France

[73] Assignee: Aluminum Pechiney, Paris, France

[21] Appl. No.: 705,415

[22] Filed: Feb. 26, 1985

Related U.S. Application Data

[63] Continuation of Ser. No. 480,215, Mar. 30, 1983, abandoned.

[30] Foreign Application Priority Data

Mar. 31, 1982 [FR] France .................. 82 05894

[51] Int. Cl.[4] .................. C25C 3/06; C01F 7/60
[52] U.S. Cl. .................. 204/67; 423/496
[58] Field of Search .................. 204/67; 423/496

[56] References Cited

U.S. PATENT DOCUMENTS

| | | | |
|---|---|---|---|
| 4,039,648 | 8/1977 | Haupin et al. | 423/496 |
| 4,459,274 | 7/1984 | Loutfy et al. | 423/496 |

FOREIGN PATENT DOCUMENTS 0713927 2/1980 U.S.S.R. .................. 204/67

*Primary Examiner*—Howard S. Williams
*Attorney, Agent, or Firm*—McDougall, Hersh & Scott

[57] ABSTRACT

A process for the production of aluminum by the electrolysis of anhydrous aluminum chloride produced by the carbochlorination of alumina in a molten salt bath containing at least one alkali metal and/or alkaline-earth metal halide, comprising carrying out the carbochlorination of the alumina and electrolysis of the aluminum chloride in a continuous production loop using the molten salt bath emanating from carbochlorination as the electrolysis bath and the molten salt bath emanating from electrolysis as the carbochlorination bath.

20 Claims, 1 Drawing Figure

PROCESS FOR THE CONTINUOUS PRODUCTION OF ALUMINUM BY THE CARBOCHLORINATION OF ALUMINA AND IGNEOUS ELECTROLYSIS OF THE CHLORIDE OBTAINED

This application is a continuation of application Ser. No. 480,215, filed 3/30/83, now abandoned.

BACKGROUND OF THE INVENTION

This invention relates to a process for the continuous production of aluminum comprising, in combination, the carbochlorination of alumina in a molten salt bath and electrolysis of the anhydrous aluminum chloride obtained in the bath emanating from carbochlorination.

It has been known for some time that aluminum chloride can be obtained by the carbochlorination of an aluminous ore or even by the carbochlorination of alumina obtained by extraction from an alumina-containing ore. The economic importance attributed to the industrial production of aluminum chloride for catalytic applications or for the electrolytic production of aluminum has prompted experts to conduct detailed research in this field. Thus, numerous processes have been described in the literature for the production of anhydrous aluminum chloride by the carbochlorination of alumina in molten salt baths.

One such process is described for example in French Pat. No. 2,334,625 and comprises contacting alumina with a source of chlorine in the presence of a reducing agent, such as carbon, in a molten salt bath consisting of at least one alkali metal and/or alkaline-earth metal chloride and aluminum chloride, the anhydrous aluminum chloride being collected in gaseous form at the bath outlet.

However, this type of process, although producing anhydrous aluminum chloride sufficiently pure for the electrolytic production of aluminum, is not effective enough to give an hourly yield of aluminum chloride which experts would regard as entirely satisfactory. This is because the alumina is introduced into the molten salt bath in the most common form, i.e. in the form of a fine white powder, the reducing agent, such as carbon, being reduced to a similar particle size.

The chlorine intended for carbochlorination of the alumina is then continuously injected in a stoichiometric proportion into the molten salt bath in which are immersed gas diffusors of known type, such as for example quartz rings, these diffusors giving rise to the formation of a very large number of very small gas bubbles which come into contact with the individual particles of alumina and carbon suspended in the stirred bath. Despite the presence of these diffusors for the gas phase, only a fraction of the chlorine introduced into the bath reacts with the alumina and the carbon while the other fraction is removed from the carbochlorination reactor with the vaporized aluminum chloride.

This lack of thorough contact between the solid and gaseous materials is the cause of a relatively low hourly output of anhydrous aluminum chloride per cubic meter of bath in spite of all the attempts to the contrary which have hitherto been made.

It has also been known for some time, as can be seen from the literature, that aluminum can be produced by the electrolysis of aluminum chloride dissolved in a molten electrolyte consisting of at least one alkali metal halide which is more difficult to reduce than the aluminum chloride itself.

The extensive literature available in this field is above all the consequence of certain observations by experts on the advantages which a process such as this would have over the Hall-Heroult process such as, for example, lower energy consumption, lower consumption of the electrodes by oxidation of their constituent graphite under the effect of the oxygen released during electrolysis of the alumina and, finally, the fact that electrolysis is carried out at a lower temperature.

However, from the time of the first experiments with the electrolysis of aluminum chloride, major disadvantages have always been encountered at an early stage, resulting in the postponement of operation of such a process on an industrial scale. Thus, for example, experts have been confronted by particularly troublesome phenomena because the most significant disadvantages emanate from the presence of metal oxides dissolved or undissolved in the electrolytic bath, such as alumina, silica, titanium oxide and iron oxide.

The reason for this is that the undissolved metal oxides are the cause of a gradual accumulation on the cathodes of a viscous layer of finely divided solids, liquid components of the bath and droplets of molten aluminum which interfere with access to the cathodes of the electrolysis bath and which can result in disturbances to the normal cathode mechanism, i.e. reduction of the cations containing the metal to be produced in various stages of oxidation. Thus, the aluminum chloride present in the viscous layer and consumed by electrolysis is increasingly more difficult to renew and, accordingly, the other chlorides making up the molten salt bath, such as the alkali and/or alkaline-earth metal chlorides, can be electrolysed, resulting in a loss of effeciency of the electricity used and in pollution of the metal produced.

In addition, because the alkali metal chlorides present in the viscous layer, such as the chlorides of sodium, potassium or lithium, are partially electrolysed by the lack of renewal of the aluminum chloride in the proximity of the cathode, they lead to the corresponding metals which infiltrate under cathode potential into the constituent graphite of the electrodes, resulting in their disintegration and destruction. This premature destruction of the cathodes results in the introduction of graphite particles into the bath which contribute to the formation of sludge, causing a reduction in the output of the electrolysis process.

Finally, another equally serious disadvandage, attributable to the presence in the bath of dissolved metal oxides, such as alumina, lies in the release of the anode of oxygen which consumes the graphite. This consumption of graphite interferes with the electrolysis process because it alters the geometric characteristics of the anodes, particularly the anode-cathode interval.

In order to eliminate the above-mentioned disadvantages emanating essentially from the presence of metal oxides and/or oxidized compounds entering the electrolysis bath with the constituents thereof or even being formed in situ due to the infiltration into the electrolysis cell of moisture reacting with the metal formed and with the chloride bath, it was proposed in French Pat. No. 2,158,238 to carry out the electrolysis of aluminum chloride dissolved in a bath of molten salts by a process in which the aluminum chloride content of the electrolysis bath is kept between 1 and 15% by weight by introducing the aluminum chloride continuously or periodically to replace the electrolysed aluminum chloride, limiting the presence of metal oxides and/or oxidized compounds in this bath so that their percentage by weight does not exceed 0.25%. To this end, it is specified that the aluminum chloride introduced into the bath should contain less than 0.25% by weight of metal oxides and that, in particular, the residual moisture which can be introduced by the aluminum chloride itself or which may initially be present in the electrolysis cell should be reduced to a minimum.

In spite of the elaborate precautions which have been taken for handling and using the aluminum chloride, i.e. between the time it is removed in gaseous form from the carbochlorination reactor and the time it is introduced in condensed form into the electrolysis cell, it has been found that this process, although alleviating the above-mentioned disadvantages, does not eliminate them completely.

Aware of the interest which a well-adapted process for the electrolysis of aluminum would have among experts, but equally aware of the disadvantages attending the processes previously described in this field, applicants-continuing their research-have found and perfected a process for the electrolysis of aluminum chloride substantially free from the disadvantages mentioned above, in which the aluminum chloride, which is known to be highly hygroscopic, is not subjected to any harmful manipulation which might result in the presence of residual oxidized compounds in the electrolysis bath.

SUMMARY OF THE INVENTION

The process according to the present invention for the electrolysis of anhydrous aluminum chloride in a molten salt bath is characterized in that carbochlorination of the alumina and electrolysis of the aluminium chloride are carried out continuously and simultaneously in the same production loop using the molten salt bath emanating from carbochlorination as the electrolysis bath and the molten salt bath emanating from electrolysis as the carbochlorination bath.

DETAILED DESCRIPTION

According to the invention, a source of alumina is contacted with a chlorinating agent in the presence of a reducing agent in a molten salt bath containing at least one alkali metal and/or alkaline-earth metal halide, after which the carbochlorination bath enriched in anhydrous aluminum chloride is subjected to filtration and, optionally, purification and the filtered bath adjusted to the desired content of anhydrous $AlCl_3$ is subjected to electrolysis the gaseous effluents consisting essentially of chlorine being capable of use as the chlorine source for carbochlorination while the $AlCl_3$-depleted electrolysis bath is returned to the carbochlorination reaction.

The molten salt bath intended for carbochlorination, of which the composition is very widely disclosed in the literature, generally consists of a mixture of at least one alkali-metal and/or alkaline-earth metal halide with aluminum chloride. Among the halides which may be introduced, it has been found to be desirable to use the chlorides of alkali and/or alkaline-earth metals, preferably the chlorides of lithium, sodium, potassium, and also the chlorides of calcium, barium and magnesium.

The molten salt bath intended for carbochlorination also comprises in the melt at most 30% and preferably from 2 to 10%, based on molar weight, of anhydrous aluminum chloride.

The temperature of the molten salt bath used for carbochlorination in accordance with the present invention is between its melting point and its boiling point under the working conditions. Applicants have found that the practical temperature range is from 450° to 900° C., although the preferential temperature range is from 660° to 800° C.

The chlorinating agent used in accordance with the invention is generally gaseous chlorine. However, it is also possible to use other chlorine donors, such as for example $CCl_4$, $C_2Cl_6$, phosgene or mixtures thereof. The chlorinating agent is introduced into the reaction medium in an at least stoichiometric quantity relative to the alumina to be carbochlorinated that is introduced into the bath.

The reducing agent used for carbochlorination may be in gaseous or solid form and is used in an at least stoichiometric quantity in relation to the alumina to be carbochlorinated that is introduced into the bath.

When the reducing agent is used in the form of a gas, it is formed by carbon monoxide, dioxalene and, optionally, by carbon tetrachloride or phosgene.

When the reducing agent is used in the form of a solid, it is preferably formed by carbon although it may even be selected from other well known reducing agents. When the reducing agent is carbon, it emanates from traditional sources well known to the expert, such as coals in general, petroleum and derivatives thereof. In this form, the reducing agent is used optionally after having been subjected to a purifying treatment, such as size reduction, so that it is in the form of small solid particles ranging for example from 0.2 to 200 mm and preferably from 0.5 to 8 mm in size.

The alumina source subjected to carbochlorination generally emanates from the calcination of hydrargillite or boehmite, hydrated aluminas emanating from the alkaline treatment of bauxite. However, it may also emanate from the decomposition of hexahydrated aluminum chloride and hydrated sulfates, sulfites or nitrates of aluminum resulting from the acid treatment of silico-aluminous ores.

However, it has interestingly been found that the various aluminas corresponding to phase transformations, such as amorphous or crystalline alumina, for example in alpha, gamma, delta, theta, iota, eta, chi and kappa form, may be successfully subjected to carbochlorination in accordance with the present invention. In addition to this fact, it was also found and later verified that the specific surface of these various forms of alumina had no effect upon carbochlorination of the alumina. In other words, the carbochlorination of an alumina having a specific surface of 2 $m^2/g$ produced results as good as those obtained in the carbochlorination of an alumina having a specific surface of 160 $m^2/g$. Thus, carbochlorination produces substantially the same results not only with various types of alumina but also with a mixture of these various types of alumina.

In practice, it is desirable for the aluminas subjected to carbochlorination to be dehydrated beforehand by known calcination processes to avoid the formation of gaseous hydrochloric acid during carbochlorination to the detriment of carbochlorination itself by consuming a fraction of the chlorine introduced into the reaction medium.

It is for this reason that it is advantageous to use alumina of the α-type which has a small specific surface and does not contain any water of constitution, needing only to be dried before being used for carbochlorination.

When the source of alumina consists solely of alumina, the alumina may be introduced into the molten salt bath in its usual form, i.e. in the form of a fine white powder. However, it may also be introduced in the more elaborate form of agglomerates obtained for example by methods known to the expert. The reason for this is that, in the course of the numerous experiments culminating in the present invention, Applicants found that the introduction into the molten salt bath of alumina in the form of a fine white powder necessitated the use of gas diffusors of known type, such as quartz rings for example, immersed in said bath for the gaseous chlorination mixture injected continuously into the carbochlorination medium, these diffusors giving rise to the formation of a very large number of very small gas bubbles which come into contact with the individual particles of alumina and carbon suspended in the stirred bath.

In the absence of complex and/or expensive technical measures, such as for example vigorous stirring or a resulting increase in the level of the bath, the sole presence of gas diffusors is insufficient to ensure an acceptable hourly output of aluminum chloride.

Because of the lack of thorough contact between the gaseous fraction blown in, formed for example by chlorine or by chlorine and carbon monoxide, the liquid fraction of molten salts and the solid fraction formed by alumina or by a mixture of alumina and carbon, it was found to be desirable to introduce the alumina source into the molten salt bath in the prepared form of agglomerates produced by agglutination.

In this case, the agglomerates of alumina forming the filling of the molten salt bath and diffusing the gaseous agents introduced are used to form a filling integrally containing the molten salt bath, in other words the total volume occupied by the alumina agglomerates and the molten salt bath is equal to the apparent volume occupied by the agglomerates alone for the same reactor section.

However, it is also possible to obtain equivalent hourly outputs of anhydrous aluminum chloride even when the filling of the molten salt bath formed by the agglomerates contains only a fraction of said bath and not the entire bath. The reason for this is that, for the same section of the carbochlorination reactor, applicants have found that the total volume occupied by the agglomerates of alumina and the molten salt bath may be greater than the apparent volume occupied by the agglomerates alone, although it preferably amounts to at most twice the apparent volume occupied by the agglomerates alone and, more particularly, to at most 1.5 times that apparent volume. The alumina agglomerates intended to be subjected to carbochlorination in accordance with the invention are generally produced by methods known to the expert.

Thus, where an amorphous alumina is agglomerated, the process-as described in French Pat. No. 1,190,094- comprises agglomerating with water a dry powder of a thorough mixture of aluminum trihydate and sodium aluminate or even the product obtained by drying an unwashed trihydrate cake at a temperature of from 80° C. to 150° C. and size-reducing said cake after drying. The dry powder of the alumina/sodium aluminate mixture is introduced into a granulator at the same time as a sufficient quantity of water. The granules obtained have a diameter of, for example, from 4 to 6 mm and are subjected to a heat treatment. However, in cases where an alumina emanating from the decomposition of hexahydrated aluminum chloride and sulfates, nitrates and sulfites of aluminum is agglomerated, agglomeration may be carried out for example by the process described in French Pat. No. 2,359,094, which comprises compacting an "intermediate product" emanating from the incomplete decomposition of one of the hydrated aluminium salts, granultating the compacted product and subjecting it to heat treatment.

However, applicants have found that the agglomerates best suited to carbochlorination in a molten salt bath by providing a high hourly yield of aluminum chloride are those having spherical forms obtained by the process described in French Pat. No. 1,077,163 which comprises initially dehydrating a hydrated alumina at a temperature in the range from 150° C. to 600° C. under such conditions that the water vapor is eliminated as it is released, subsequently size-reducing the dehydrated product to obtain the particle size distribution most suited to the method of agglomeration envisaged and then forming the spherical granules by compression, extrusion or granulation in a granulation box using as binder water in which one or more metal salts may optionally be dissolved, hardening the agglomerates in a humid atmosphere, which may be obtained by evaporation of some of the water used for agglomeration, increasing the temperature of the medium to accelerate hardening without however exceeding the temperature of 150° C. and, finally, subjecting the spherical agglomerates thus obtained to a heat treatment according to the application for which they are intended.

However, the alumina may be introduced into the molten salt bath in the form of bars of alumina produced by known methods from alumina agglomerates bound for exammple by means of salts entering into the composition of the carbochlorination bath, said bars having the property of disintegrating in the molten salt bath to form alumina agglomerates subjected to the carbochlorination reaction.

Applicants also found that it was possible to feed the molten salt bath with mixed agglomerates consisting of a mixture of alumina and a reducing agent, such as carbon. The largest particle size of the alumina agglomerates and of the mixed agglomerates of alumina and reducing agent should be between 0.2 and 200 mm and is preferably in the range from 0.5 to 8 mm.

In practice, it is desirable for the agglomerates of alumina alone or of alumina and carbon and derivatives thereof to be thoroughly dehydrated and dehydrogenated by known calcination processes to ensure that no gaseous hydrochloric acid is formed during carbochlorination to the detriment of the carbochlorination reaction itself which would consume a fraction of the chlorinating agent introduced into the reaction medium.

Since the filling of the bath formed by the agglomerates is consumable, provision has to be made to ensure a regular supply of agglomerates to the reaction medium so that not only are they a source of alumina to be carbochlorinated, but the supply also maintains the filling so that the total volume occupied by the agglomerates of alumina and the molten salt bath is at most twice the apparent volume occupied by the agglomerates alone and, preferably, at most 1.5 times that apparent volume.

Finally, carbochlorination of the alumina is advantageously carried out under the pressure of reaction gases, thus enabling the gas mixture to be better diffused in the molten salt bath. A carbochlorination process such as this carried out under pressure enables the conversion of alumina into aluminum chloride to be increased. In this case, only the carbochlorination zone is under pressure. The electrolysis zone operates under atmospheric pressure or under a pressure close to atmospheric pressure.

As already mentioned, the molten salt bath used for the carbochlorination of a source of alumina emanates from an electrolysis cell where it is depleted in regard to its $AlCl_3$ content. It is then introduced into at least one carbochlorination reactor where it is re-enriched with anhydrous aluminum chloride before being returned to the electrolysis cell. Thus, the carbochlorination reactor simultaneously receives the $AlCl_3$-depleted electrolysis bath, the chlorine produced during the electrolysis, of which the quantity is if necessary supplemented with a fresh input of chlorine, the reducing agent and the source of alumina intended to be carbochlorinated.

On leaving the carbochlorination reactor, the molten salt bath enriched in $AlCl_3$ and containing from 5 to 60% and preferably from 10 to 40%, based on molar weight, of $AlCl_3$ is subjected to a separating operation in order to eliminate both the alumina which has not been reacted during carbochlorination and the carbon when the reducing agent introduced is in solid form. The presence of alumina can lead to premature wear of the anodes of the electrolysis cell whereas the presence of carbon can prevent a high current efficiency from being obtained. In addition, the presence of one or other of these agents can result in changes in the operating parameters.

Thus, the presence of dissolved or undissolved metal oxides, such as alumina, in the electrolytic bath results in particularly troublesome phenomena:

Firstly, undissolved metal oxides are the cause of a gradual accumulation on the electrodes of a viscous layer of finely divided solids, liquid constituents of the bath and droplets of molten aluminum which interfere with access to the cathodes of the electrolysis bath and which can result in disturbances to the normal cathode mechanism, i.e. reduction of the cations containing the metal to be produced in various stages of oxidation. Thus, the aluminum chloride present in the viscous layer and then consumed by electrolysis is increasingly difficult to renew and, accordingly, the other chlorides, such as the alkali metal and/or alkaline-earth metal chlorides, which make up the molten salt bath can be electrolyzed, resulting in a loss of efficiency of the electricity used and in contamination of the metal.

Secondly, because the alkali metal chlorides which make up the molten salt bath, such as those of sodium and/or potassium and/or lithium, are partially electrolyzed through the lack of renewal of the aluminum chloride in the proximity of the cathode, they lead to the corresponding metals which infiltrate under cathode potential into the constituent graphite of the electrodes, causing their disintegration and destruction. This premature destruction of the cathodes results in the introduction of carbon particles into the bath which contribute to the formation of sludge, causing a reduction in the output of the electrolysis process.

Finally, another serious disadvantage attributable to the presence in the bath of dissolved metal oxides, such as alumina, lies in the release at the anode of oxygen which consumes the carbon. This consumption interferes with the electrolysis process because it alters the geometric characteristics of the anodes, particularly the anode-cathode interval. Separation is generally carried out by means of a special filtering medium for molten salt baths capable of operating continuously or in batches, the filtering medium being formed for example by powder-form metals, sintered metals, molten quartz, carbon in the form of fibers, or in a fixed bed, glass cloths or even in the form of ceramic frits, as well known to the those skilled in the art.

In general, the filtration process takes place in two filtering zones, one in use while the other is being unblocked or changed.

After this filtration process, it may be of advantage to complete purification of the molten salt bath intended for the electrolysis of the aluminum chloride by eliminating the residual traces of oxides or oxychlorides by a process known to the expert such as, for example, carbochlorination or preliminary auxiliary electrolysis. After the molten salt bath enriched in aluminum chloride has been filtered and optionally purified, it is diluted with a depleted fraction of the molten salt bath emanating from the electrolysis cell so that a bath of suitable composition is available for the electrolysis cell. This bath is then introduced into an electrolysis cell of the multipolar type as described, for example, in applicants' French Patent Application No. 81 11021.

The electrolysis bath generally contains from 2 to 40% and preferably from 4 to 30%, based on molar weight, of anhydrous aluminum chloride in its molten zone at the entrance to the electrolysis cell.

The temperature of the electrolysis bath is generally in the range from 450° C. to 900° C. and preferably in the range from 660° C. to 800° C.

The rate of supply of bath enriched in $AlCl_3$ is regulated for example by a level detector and the $AlCl_3$ concentration of the bath by means of a conductive cell. The rate of supply is of course regulated according to the $AlCl_3$ concentration of the supply bath or of the electrolysis cell and the output of metal of said cell.

BRIEF DESCRIPTION OF THE DRAWING

The process according to the invention will be better understood from the following description in conjunction with the accompanying drawing which shows one embodiment of the invention.

DETAILED DESCRIPTION OF THE INVENTION

Figure 1:
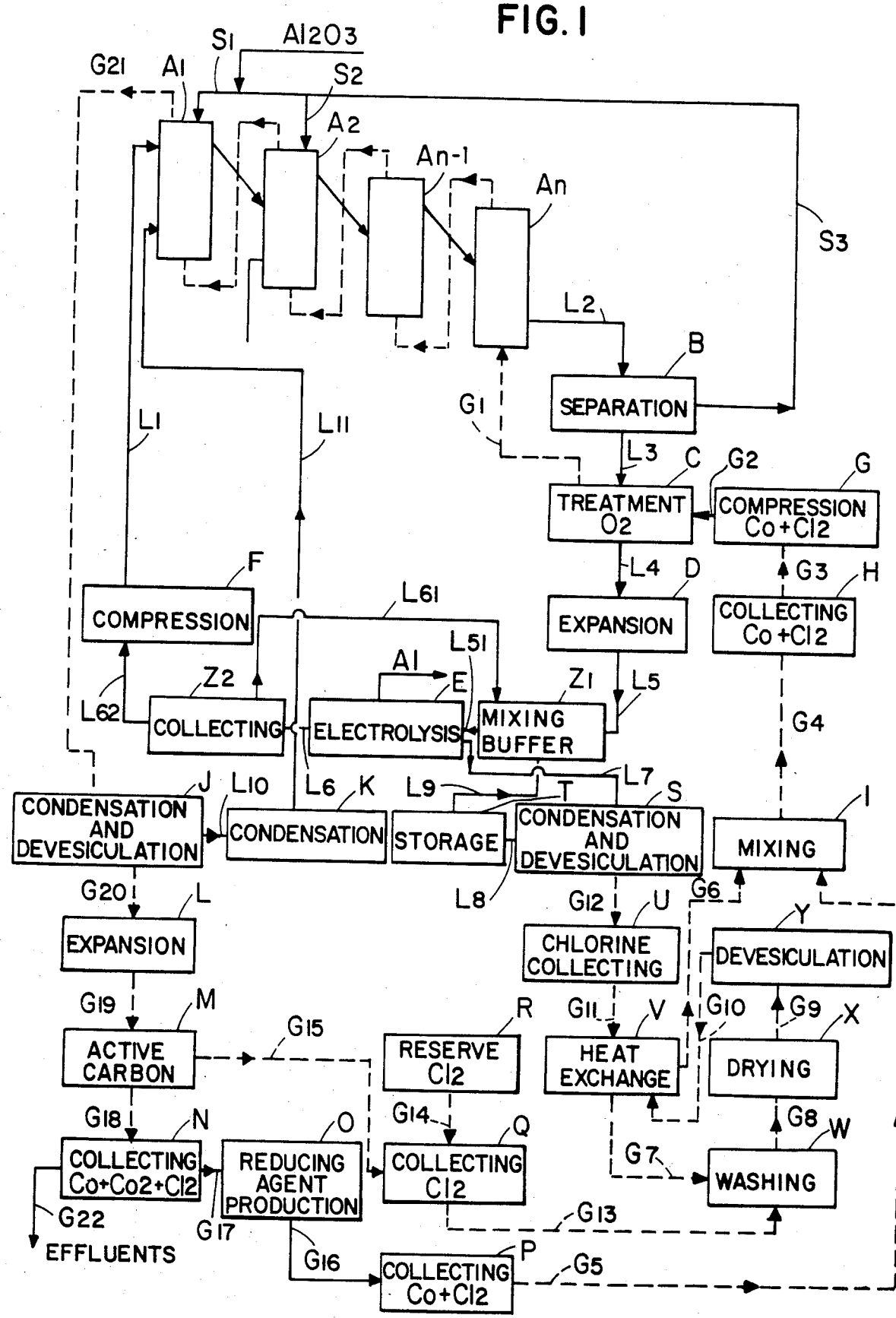

As shown in the FIGURE, the molten salt bath $L_1$ depleted in aluminium chloride and coming from the compression zone (F) is introduced into the first of the n carbochlorination reactors $(A_1)$, $(A_2)$, $(A_{n-1})$ and $(A_n)$ arranged in cascade formation, said baths circulating from the reactor $(A_1)$ to the reactor $(A_n)$ while the alumina to be carbochlorinated is introduced into the reactors $(A_1)$ and $(A_2)$ by the units $S_1$ and $S_2$.

The mixture formed by the molten salt baths and the alumina kept at the carbochlorination temperature is brought into thorough contact with the gas mixture $G_1$ formed by a mixture of $CO+Cl_2$ injected at the base of the carbochlorination reactor $(A_n)$ and circulating in the opposite direction to the bath, i.e. from $(A_n)$ to $(A_1)$.

The gaseous effluents $G_{21}$ emanating from the carbochlorination reactor $(A_1)$, a mixture of the unreacted reaction gases, such as CO and $Cl_2$, gases formed during the reaction, such as $CO_2$, and finally the constituent metal chlorides of the bath, such as $NaCl_4Al$, $LiCl_4Al$, and the like are introduced into the condensation and devesiculation zone (J) in which the metal halides are condensed and separated from the residual gas mixture. The liquid fraction $L_{10}$ formed of the condensed metal halides is placed in a storage zone (K) from which it is recycled in the form $L_{11}$ into the carbochlorination zone ($A_1$). The residual gas mixture $G_{20}$ emanating from the condensation and devesiculation zone (J) is then introduced into an expansion zone (L).

The molten salt bath $L_2$ enriched in anhydrous aluminum chloride and issuing from the last carbochlorination reactor ($A_n$) is introduced into a zone (B) in which the enriched bath is separated from unreacted solids (for example $Al_2O_3$) which are removed from the cycle via $S_3$ for retreatment.

The molten salt bath $L_3$ enriched in $AlCl_3$ coming from the separation zone (B) is treated in the deoxidation zone (C) with the reducing medium $G_2$ formed by the gas mixture $CO+Cl_2$ coming from the compression zone (G). The excess reducing medium $G_2$ forms the carbochlorinating gas mixture $G_1$ which is injected into the reactor ($A_n$).

On issuing from the treatment zone (C), the deoxidized molten salt bath $L_4$ enriched in $AlCl_3$ is introduced into an expansion zone (D) in which the pressure prevailing in the carbochlorination zone is brought to the pressure prevailing in the electrolysis zone.

The molten salt bath $L_5$ enriched in $AlCl_3$ and depleted in oxygen is then introduced into the mixing-buffer zone ($Z_1$) in which it is diluted with a fraction $L_{61}$ taken from the collecting zone ($Z_2$) situated at the exit of the electrolysis cell (E) so that a bath $L_{51}$ of appropriate composition is introduced into the electrolysis cell.

The gaseous effluents $L_7$ emanating from the electrolysis process and consisting essentially of chlorine accompanied by a small fraction of the electrolysis bath in the form of gaseous metal halides are introduced into a zone (S) in which the metal halides, such as $AlCl_4Na$ and $AlCl_4Li$ are condensed and separated from the chlorine. The liquid fraction $L_8$ formed of the condensed metal halides is placed in a storage zone (T) from which it is recycled in the form $L_9$ into the buffer-mixing zone ($Z_1$). The gaseous fraction $G_{12}$ issuing from the condensation zone (S) is placed in a collecting zone (U).

The molten salt bath $L_6$ depleted in $AlCl_3$ and issuing from the electrolysis cell (E) is collected in a collecting zone ($Z_2$) which feeds the buffer-mixing zone ($Z_1$) through $L_{61}$ and a compression zone (F) through $L_{67}$, in which said bath is brought to the carbochlorination pressure before being recycled through $L_1$ into the carbochlorination zone formed by the reactors ($A_1$) to ($A_n$). Finally, the liquid metal is removed from the electrolysis zone (E).

The gas mixture $G_{20}$ coming from the condensation and devesiculation zone (J) for the gaseous effluents $G_{21}$ from the carbochlorination reaction is introduced into an expansion zone (L) in which it is brought to atmospheric pressure.

The gas mixture $G_{19}$ coming from the expansion zone (L) is introduced into a treatment zone (M) in which the chlorine is separated—by fixing to active carbon—from the rest of the gas mixture $G_{18}$ comprising $CO_2$, CO, a little chlorine and impurities.

The gaseous fraction $G_{18}$ is introduced into the collecting zone (N) in which it may be completely or partly removed from the carbochlorination-electrolysis cycle through $G_{22}$.

The fraction $G_{17}$ coming from the collecting zone (N) is delivered to a zone (O) for the production of reducing agents, such as CO. On leaving (O), the fraction $G_{16}$ rich in CO is introduced into a collecting zone (P) from which it feeds (arrow $G_5$) the mixing zone (I) to prepare the carbochlorinating gas by the mixing of CO and $Cl_2$.

The fraction of $Cl_2$ fixed to active carbon in the zone (M) is recovered by heat treatment and constitutes the fraction $G_{15}$ introduced into the collecting zone (Q) fed by the gaseous fraction $G_{14}$ coming from the reserve (R) of fresh chlorine.

The chlorine collected at (Q) is introduced through $G_{13}$ into the washing zone (W). This washing zone is also fed through $G_7$ with chlorine coming from the electrolysis zone (E) after condensation and devesiculation in (S) of the effluents $L_7$, recovery of the gas fraction $G_{12}$ collected in the zone (U) and transfer of the fraction $G_{11}$ coming from the zone (U) to a heat exchanger (V).

The chlorine fractions $G_7$ and $G_{13}$ washed in (W) form the gas fraction $G_8$ which is dried in the zone (X) to give a gas fraction $G_9$ which is subjected to devesiculation in the zone (Y).

The gas fraction $G_{10}$ issuing from the zone (Y) and formed by chlorine is introduced into the heat exchange zone (V) and, on issuing from that zone, becomes the gaseous fraction of hot chlorine $G_6$ which is introduced into the mixing zone (I).

The mixture of $CO+Cl_2$ intended for the carbochlorination of alumina is prepared in the zone (I) by the additions $G_5$ of CO and $Cl_2$ gas and $G_6$ of $Cl_2$ gas in such a way that the mixture conforms to the relative proportions of both constituents.

The appropriate mixture of CO and $Cl_2$ forming the gas fraction $G_4$ coming from the zone (I) is introduced into the collecting zone (H) which through $G_3$ feeds the compression zone (G) enabling the carbochlorinating mixture $G_2$ introduced into the treatment zone (C) to be brought to the carbochlorination pressure.

EXAMPLE (illustrated by the drawing)

In order to continuously produce approximately 1150 kg per day of aluminum by the process according to the invention, the carbochlorination of alumina and the electrolysis of the anhydrous aluminum chloride produced were carried out in the same loop and in a molten salt bath of a pilot installation.

To this end, two carbochlorination reactors arranged in cascade formation and each having a capacity of 0.8 $m^3$ were fed with at least 259 kg/hour of a molten salt bath $L_1$ coming from the collecting zone ($Z_2$) through $L_{62}$ and having the following composition (in percent by weight):

| | |
|---|---|
| NaCl | 54.04% |
| LiCl | 36.03% |
| $AlCl_3$ | 9.86% |
| $O_2$ | 0.07% |

This bath fraction $L_{62}$ was compressed to a pressure of 2 bars absolute in (F) and then introduced into the first carbochlorination reactor ($A_1$).

Together, the two carbochlorination reactors contained 1300 kg of molten salt bath. The composition of the bath at the exit $L_2$ of the second carbochlorination reactor was as follows (in percent by weight):

| | |
|---|---|
| NaCl | 28.21% |
| LiCl | 18.81% |
| AlCl$_3$ | 52.73% |
| O$_2$ | 0.25% |

The temperature of the bath inside the carbochlorination zone was kept at 720° C.±10° C. and the carbochlorination pressure at 2 bars. 92 kg/h of dried agglomerates of Bayer alumina containing 0.5% of Na$_2$O (i.e. 0.46 kg/h of Na$_2$O) and having a specific surface of 50 m$_2$/g were simultaneously introduced into the carbochlorination reactors (A$_1$) and (A$_2$).

The volume occupied by the molten salt bath and the agglomerates was 1.2 m$^3$.

The carbochlorinating gas mixture G$_1$ consisting of CO and Cl$_2$ in a stoichiometric ratio was introduced into the molten salt bath at a rate of 126 normal cubic meters per hour.

The gaseous effluents G$_{21}$ emanating from the carbochlorination reaction were introduced into the condensation and devesiculation zone (J). 65 normal cubic meters per hour of a gas fraction G$_{20}$ were collected at the exit of (J) and introduced into the expansion zone (L). 496 kg/h of the molten salt bath L$_2$ were collected at the exit of the carbochlorination zone. This fraction L$_2$ of the molten salt bath was subjected to filtration in (B) by means of a cascade of quartz cloths and a plug of porous alumina which enabled 1.6 kg/h of unreacted alumina to be collected and returned to the carbochlorination zone through S$_3$.

The fraction L$_3$ of the molten salt bath enriched in AlCl$_3$ and free from Al$_2$O$_3$ is treated in (C) with the carbochlorinating mixture G$_2$. This gas mixture G$_2$ consisting of CO and Cl$_2$ in a stoichiometric ratio was introduced into the treatment zone (C) formed by a filling of pitch coke at a rate of approximately 126 normal cubic meters per hour under a pressure of 2 bars.

The molten salt bath enriched in AlCl$_3$ occupied a volume of 0.4 m$^3$ in the treatment zone (C). It was kept at a temperature of 720° C.±10° C. and a pressure of the order of 2 bars prevailed inside the treatment zone.

The gaseous reactants coming from (C) formed the carbochlorinating mixture G$_1$ introduced into the carbochlorination zone.

On leaving the treatment zone (C), the deoxidized molten salt bath L$_4$ enriched in AlCl$_3$ weighed 494 kg/h and had the following composition (in percent by weight):

| | |
|---|---|
| NaCl | 28.28% |
| LiCl | 18.85% |
| AlCl$_3$ | 52.86% |
| O$_2$ | 0.01% |

The bath L$_4$ was first introduced into the expansion zone (D) where the pressure was returned to atmospheric pressure and then, through L$_5$, into the 1.5 cubic meter capacity mixing-buffer zone (Z$_1$) in which it was diluted with 564 kg/h of bath L$_{61}$ taken from the collecting zone (Z$_2$) situated downstream of the electrolysis zone (E).

The molten salt bath L$_{51}$, which had the following composition (in percent by weight):

| | |
|---|---|
| NaCl | 42.00% |
| LiCl | 28.00% |
| AlCl$_3$ | 30.00% |
| O$_2$ | <0.01% | was then introduced into the electrolysis zone (E) at a rate of 1058 kg/h. The electrolysis zone (E) was formed by an electrolysis cell of known type as described in French Pat. No. 2,301,443.

The molten salt bath of the cell weighed 2500 kg. The electrolysis bath was kept at a temperature of 720° C.±10° C. The operating conditions of the cell were as follows:

| | |
|---|---|
| Current density per cm$^2$ | 0.8 A/cm$^2$ |
| Intensity passing through the cell | 13 516 A |
| Mean hourly weight of Al produced | 47.92 kg/h |
| Current efficiency | 88% |
| Voltage drop at the terminals | 31 V |
| Consumption of electricity per tonne of Al produced | 8 744 KWh |

The aluminum produced was removed under suction inside the cell through a trap formed in an insulating refractory tube of silicon carbide.

The gaseous effluents L$_7$ from the electrolysis process represented a volume of 60 normal cubic meters per hour.

These gaseous effluents were introduced into a condensation and devesiculation zone (S) in which Cl$_2$ was separated from LiCl$_4$Al and NaCl$_4$Al which were recycled through (T) to the electrolysis cell (E).

The molten salt bath L$_6$ depleted in AlCl$_3$ and issuing from the electrolysis cell (E) weighed 821 kg/h and had the following composition (in percent by weight):

| | |
|---|---|
| AlCl$_3$ | 9.87% |
| LiCl | 36.05% |
| NaCl | 54.08% |
| O$_2$ | traces |

This bath L$_6$ depleted in AlCl$_3$ was then introduced into the 1.5 cubic meter capacity collecting zone (Z$_2$) which, through L$_{61}$, fed the buffer-mixing zone (Z$_1$) and, through L$_{62}$, the compression zone (F) in which the bath was compressed to a pressure of 2 bars before being returned to the carbochlorination zone.

It will be understood that changes and modifications can be made in the present process without departing from the spirit thereof, particularly as defined in the following claims.

We claim:

1. In a process for the production of aluminum by the electrolysis of anyhdrous aluminum chloride produced by the carbochlorination of alumnina in a reactor using a chlorinating agent and a carbonaceous reducing agent in a molten salt bath containing at least one alkali metal halide and/or alkaline-earth metal halide, the improvement which comprises carrying out the carbochlorination of the alumina and electrolysis of the aluminum chloride continuously in the same production loop using the molten salt bath emanating from the carbochlorination as the electrolysis bath and the molten salt bath emanating from electrolysis as the carbochlorination bath; wherein the molten salt bath intended for carbochlorination contains from 2 to 10% by molar weight anhydrous aluminum chloride and the molten salt bath forming the electrolysis bath contains from 4 to 40% by molar weight anhydrous aluminum chloride; and wherein said molten salt bath emanating from the carbochlorination of alumina is deoxidized by treatment with a reducing medium formed by a mixture of CO and $Cl_2$ gases, the excess of said reducing medium being injected into the carbochlorination reactor.

2. A process as claimed in claim 1 wherein the molten salt bath emanating from carbochlorination of the alumina is subjected to filtration.

3. A process as claimed in claim 1 wherein the molten salt bath emanating from carbochlorination of the alumina is treated to remove dissolved oxygen.

4. A process as claimed in claim 1 wherein the chlorinating agent is introduced into the molten salt bath in an at least stoichiometric proportion relative to the alumina introduced for carbochlorination.

5. A process as claimed in claim 1 wherein the chlorinating agent is selected from the group consisting of gaseous chlorine, $CCl_4$, $C_2Cl_6$, phosgene and mixtures thereof.

6. A process as claimed in claim 1 wherein the reducing agent is selected from the group consisting of carbon, carbon monoxide and dioxalene in at least stoichiometric proportion relative to the alumina introduced for carbochlorination.

7. A process as claimed in claim 1 wherein the carbochlorination is carried out under the pressure of the reaction gases.

8. A process as claimed in claim 1 wherein the alkali metal halide and/or alkaline-earth metal halide are selected from the group consisting of the chlorides of lithium, sodium, potassium, calcium, barium and magnesium.

9. A process as claimed in claim 1 wherein the molten salt bath is filled with agglomerates of alumina to establish thorough contact between the gas, liquid and solid phases.

10. A process as claimed in claim 9 wherein the largest particle size of the agglomerates of anhydrous alumina is between 0.5 and 200 mm.

11. A process as claimed in claim 9 wherein the agglomerates of alumina are obtained by the mixed agglomeration of alumina powders and a reducing agent.

12. A process as claimed in claim 9 wherein the total volume occupied by the agglomerates of alumina and the molten salt bath is at least equal to and at most twice the apparent volume occupied by the agglomerates alone for the same section of a carbochlorination reactor.

13. A process as claimed in claim 1 wherein the carbochlorination temperature is in the range from 450° C. to 900° C.

14. A process as claimed in claim 1 wherein the molten salt issuing from the carbochlorination reactor comprises in the melt from 5 to 60% anhydrous aluminum chloride, based on molar weight.

15. A process as claimed in claim 1 wherein the molten salt bath emanating from the carbochlorination reactor is expanded before introduction into the electrolysis zone.

16. A process as claimed in claim 1 wherein the temperature of the electrolysis bath is in the range from 450° C. to 900° C.

17. A process as claimed in claim 1 wherein the source of alumina introduced into the molten salt bath is in the form of bars made from agglomerates of alumina bonded together by means of salts added to the composition of the carbochlorination bath.

18. A process as claimed in claim 1 wherein the carbochlorination temperature is in the range from 660° C. to 800° C.

19. A process as claimed in claim 1 wherein the molten salt bath issuing from the carbochlorination reactor comprises in the melt from 10 to 40% anhydrous aluminum chloride, based on molar weight.

20. A process as claimed in claim 1 wherein the temperature of the electrolysis bath is in the range from 660° C. to 800° C.

* * * * *